(12) United States Patent
Luan et al.

(10) Patent No.: US 12,717,708 B2
(45) Date of Patent: Aug. 25, 2026

(54) MODULO OPERATIONS FOR INTERLEAVED MEMORY HAVING NON-POWER-OF-TWO CHANNELS

(71) Applicant: ARTERIS, INC., Campbell, CA (US)

(72) Inventors: Hao Luan, Plano, TX (US); Brian Huang, New Taipei City (TW)

(73) Assignee: ARTERIS, INC., Campbell, CA (US)

( * ) Notice: Subject to any disclaimer, the term of this patent is extended or adjusted under 35 U.S.C. 154(b) by 13 days.

(21) Appl. No.: 19/044,615

(22) Filed: Feb. 3, 2025

(65) Prior Publication Data

US 2026/0228121 A1 Aug. 6, 2026

(51) Int. Cl.
*G06F 12/02* (2006.01)
*G06F 7/72* (2006.01)

(52) U.S. Cl.
CPC .......... *G06F 12/0223* (2013.01); *G06F 7/727* (2013.01)

(58) Field of Classification Search
CPC ............................. G06F 12/0223; G06F 7/727
See application file for complete search history.

(56) References Cited

U.S. PATENT DOCUMENTS 7,051,184 B2 * 5/2006 Lane .................. G06F 12/0864 711/E12.018
7,884,829 B1 * 2/2011 Van Dyke .............. G06F 12/10 345/568
8,886,898 B2 * 11/2014 Cypher .............. G06F 12/0607 711/E12.079
10,140,223 B2 * 11/2018 Chun ................. G06F 13/1678
12,504,878 B1 * 12/2025 Krimer ................ G06F 3/0604
2015/0089168 A1 * 3/2015 Kalyanasundharam .................... G06F 12/0607 711/157
2022/0035599 A1 * 2/2022 Chang ..................... G06F 7/535
2024/0104017 A1 * 3/2024 Cai ........................ G06F 7/727

* cited by examiner

*Primary Examiner* — Mark A Giardino, Jr.
(74) *Attorney, Agent, or Firm* — Dana Legal Services; Jubin Dana

(57) ABSTRACT

An electronic system includes system memory having N interleaved channels, where N is not a power of two. A hardware-implemented method for the electronic system includes receiving a request to access the system memory, the request including an M-bit address; and processing the address to calculate a modulo N of the address without performing division-by-N. The modulo N of the address is calculated as $[\Sigma_i\ \alpha_i \bmod N{*}2^{b_i} \bmod N] \bmod N$, where $\Sigma_i\ \alpha_i{*}2^{b_i}$ represents the M-bit address, $a_i$ is an $i^{th}$ word in the address, and $2^{b_i}$ is a power of two associated with the $i^{th}$ word. The method further includes using the modulo N of the address as an offset to determine which of the N interleaved channels to access.

20 Claims, 10 Drawing Sheets

FIG. 2

| |
|---|
| 32'b1100_0000_0000_0000_0000_000Y_YYXX_XXXX |
| 32'b1100_0000_0000_0000_0000_001Y_YYXX_XXXX |
| 32'b1100_0000_0000_0000_0000_010Y_YYXX_XXXX |
| 32'b1100_0000_0000_0000_0000_011Y_YYXX_XXXX |
| . . . |
| 32'b1100_3000_0000_0000_0000_000Y_YYXX_XXXX |

| |
|---|
| 32'b1100_0000_0000_0000_0000_000Y_YYXX_XXXX |
| 32'b1100_0000_0000_0000_0000_001Y_YYXX_XXXX |
| 32'b1100_0000_0000_0000_0000_010Y_YYXX_XXXX |
| 32'b1100_0000_0000_0000_0000_011Y_YYXX_XXXX |
| . . . |
| 32'b1100_3000_0000_0000_0000_000Y_YYXX_XXXX |

| |
|---|
| 32'b1100_0000_0000_0000_0000_000Y_YYXX_XXXX |
| 32'b1100_0000_0000_0000_0000_001Y_YYXX_XXXX |
| 32'b1100_0000_0000_0000_0000_010Y_YYXX_XXXX |
| 32'b1100_0000_0000_0000_0000_011Y_YYXX_XXXX |
| . . . |
| 32'b1100_3000_0000_0000_0000_000Y_YYXX_XXXX |

FIG. 3

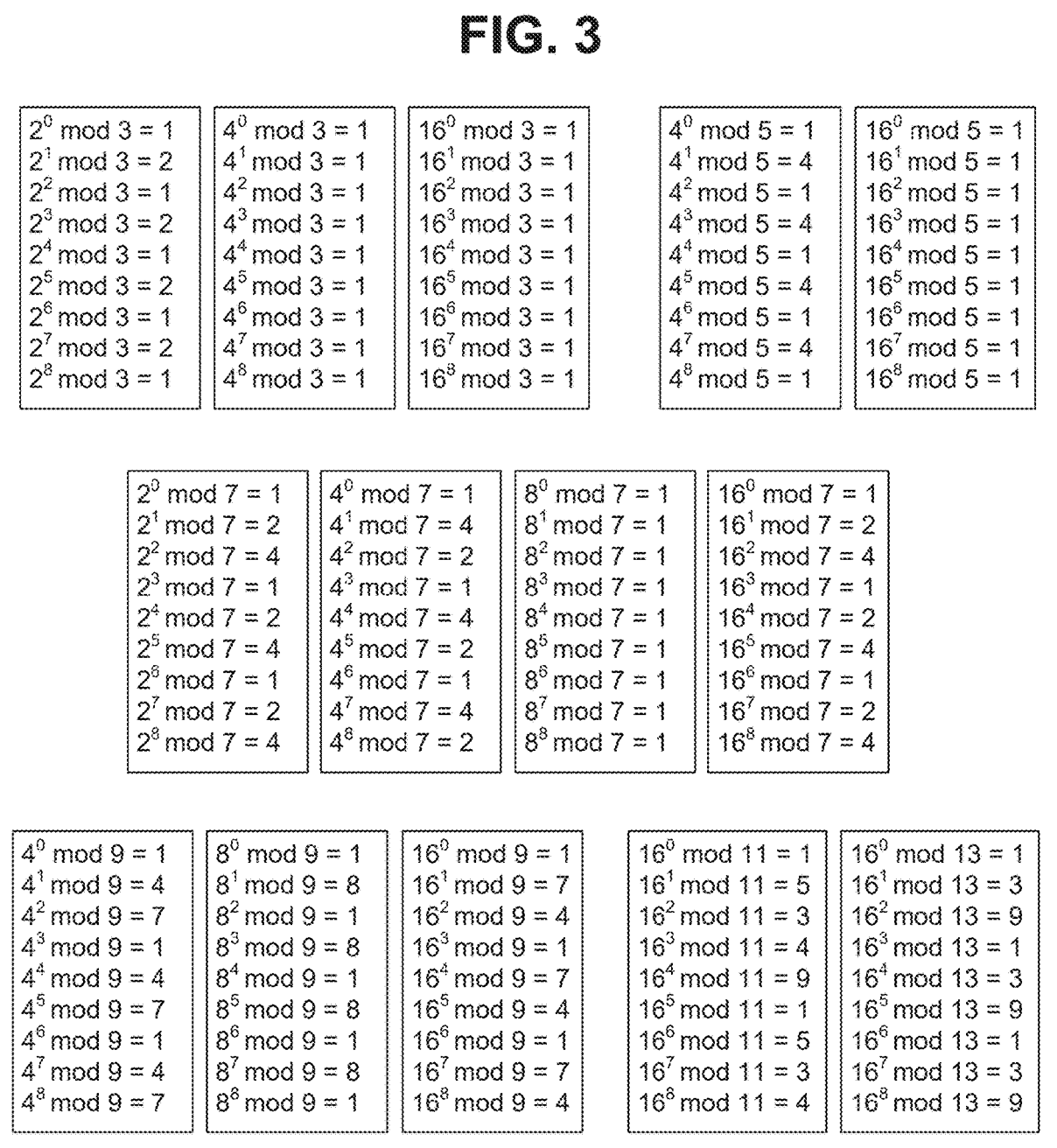

$2^0 \bmod 3 = 1$
$2^1 \bmod 3 = 2$
$2^2 \bmod 3 = 1$
$2^3 \bmod 3 = 2$
$2^4 \bmod 3 = 1$
$2^5 \bmod 3 = 2$
$2^6 \bmod 3 = 1$
$2^7 \bmod 3 = 2$
$2^8 \bmod 3 = 1$ $4^0 \bmod 3 = 1$
$4^1 \bmod 3 = 1$
$4^2 \bmod 3 = 1$
$4^3 \bmod 3 = 1$
$4^4 \bmod 3 = 1$
$4^5 \bmod 3 = 1$
$4^6 \bmod 3 = 1$
$4^7 \bmod 3 = 1$
$4^8 \bmod 3 = 1$ $16^0 \bmod 3 = 1$
$16^1 \bmod 3 = 1$
$16^2 \bmod 3 = 1$
$16^3 \bmod 3 = 1$
$16^4 \bmod 3 = 1$
$16^5 \bmod 3 = 1$
$16^6 \bmod 3 = 1$
$16^7 \bmod 3 = 1$
$16^8 \bmod 3 = 1$ $4^0 \bmod 5 = 1$
$4^1 \bmod 5 = 4$
$4^2 \bmod 5 = 1$
$4^3 \bmod 5 = 4$
$4^4 \bmod 5 = 1$
$4^5 \bmod 5 = 4$
$4^6 \bmod 5 = 1$
$4^7 \bmod 5 = 4$
$4^8 \bmod 5 = 1$ $16^0 \bmod 5 = 1$
$16^1 \bmod 5 = 1$
$16^2 \bmod 5 = 1$
$16^3 \bmod 5 = 1$
$16^4 \bmod 5 = 1$
$16^5 \bmod 5 = 1$
$16^6 \bmod 5 = 1$
$16^7 \bmod 5 = 1$
$16^8 \bmod 5 = 1$ $2^0 \bmod 7 = 1$
$2^1 \bmod 7 = 2$
$2^2 \bmod 7 = 4$
$2^3 \bmod 7 = 1$
$2^4 \bmod 7 = 2$
$2^5 \bmod 7 = 4$
$2^6 \bmod 7 = 1$
$2^7 \bmod 7 = 2$
$2^8 \bmod 7 = 4$ $4^0 \bmod 7 = 1$
$4^1 \bmod 7 = 4$
$4^2 \bmod 7 = 2$
$4^3 \bmod 7 = 1$
$4^4 \bmod 7 = 4$
$4^5 \bmod 7 = 2$
$4^6 \bmod 7 = 1$
$4^7 \bmod 7 = 4$
$4^8 \bmod 7 = 2$ $8^0 \bmod 7 = 1$
$8^1 \bmod 7 = 1$
$8^2 \bmod 7 = 1$
$8^3 \bmod 7 = 1$
$8^4 \bmod 7 = 1$
$8^5 \bmod 7 = 1$
$8^6 \bmod 7 = 1$
$8^7 \bmod 7 = 1$
$8^8 \bmod 7 = 1$ $16^0 \bmod 7 = 1$
$16^1 \bmod 7 = 2$
$16^2 \bmod 7 = 4$
$16^3 \bmod 7 = 1$
$16^4 \bmod 7 = 2$
$16^5 \bmod 7 = 4$
$16^6 \bmod 7 = 1$
$16^7 \bmod 7 = 2$
$16^8 \bmod 7 = 4$ $4^0 \bmod 9 = 1$
$4^1 \bmod 9 = 4$
$4^2 \bmod 9 = 7$
$4^3 \bmod 9 = 1$
$4^4 \bmod 9 = 4$
$4^5 \bmod 9 = 7$
$4^6 \bmod 9 = 1$
$4^7 \bmod 9 = 4$
$4^8 \bmod 9 = 7$ $8^0 \bmod 9 = 1$
$8^1 \bmod 9 = 8$
$8^2 \bmod 9 = 1$
$8^3 \bmod 9 = 8$
$8^4 \bmod 9 = 1$
$8^5 \bmod 9 = 8$
$8^6 \bmod 9 = 1$
$8^7 \bmod 9 = 8$
$8^8 \bmod 9 = 1$ $16^0 \bmod 9 = 1$
$16^1 \bmod 9 = 7$
$16^2 \bmod 9 = 4$
$16^3 \bmod 9 = 1$
$16^4 \bmod 9 = 7$
$16^5 \bmod 9 = 4$
$16^6 \bmod 9 = 1$
$16^7 \bmod 9 = 7$
$16^8 \bmod 9 = 4$ $16^0 \bmod 11 = 1$
$16^1 \bmod 11 = 5$
$16^2 \bmod 11 = 3$
$16^3 \bmod 11 = 4$
$16^4 \bmod 11 = 9$
$16^5 \bmod 11 = 1$
$16^6 \bmod 11 = 5$
$16^7 \bmod 11 = 3$
$16^8 \bmod 11 = 4$ $16^0 \bmod 13 = 1$
$16^1 \bmod 13 = 3$
$16^2 \bmod 13 = 9$
$16^3 \bmod 13 = 1$
$16^4 \bmod 13 = 3$
$16^5 \bmod 13 = 9$
$16^6 \bmod 13 = 1$
$16^7 \bmod 13 = 3$
$16^8 \bmod 13 = 9$

FIG. 10

| Exponent (n) | $2^n$ | Quotient $2^n/3$ | Remainder $2^n$(mod 3) |
|---|---|---|---|
| 0 | 1 | 0 | 1 |
| 1 | 2 | 0 | 2 |
| 2 | 4 | 1 | 1 |
| 3 | 8 | 2 | 2 |
| 4 | 16 | 5 | 1 |
| 5 | 32 | 10 | 2 |
| 6 | 64 | 21 | 1 |
| 7 | 128 | 42 | 2 |
| 8 | 256 | 85 | 1 |
| 9 | 512 | 170 | 2 |
| 10 | 1024 | 341 | 1 |
| 11 | 2048 | 682 | 2 |

MODULO OPERATIONS FOR INTERLEAVED MEMORY HAVING NON-POWER-OF-TWO CHANNELS

TECHNICAL FIELD

The present technology is in the field of electronic systems including system memory.

BACKGROUND

A system on chip (SoC) may include multiple processors that communicate with system memory. The system memory may include power-of-two memory channels (e.g., two memory channels, four memory channels) that are interleaved. However, there are instances where power-of-two memory channels are not available. For instance, physical dimensions of the SoC might not be large enough to fit power-of-two memory devices.

Consider the example of system memory having three channels. When a memory access request is sent to the system memory, an address decoder determines which channel will be accessed. This determination may be made by performing a modulo 3 operation on the address. If the result of the modulo 3 operation—the remainder—equals zero, the first channel is accessed. The second channel is accessed if the remainder equals one, and the third channel is accessed if the remainder equals two.

To calculate the remainder, the address decoder may perform a divide-by-3 operation. However, binary division has relatively high delay and logic complexity. Moreover, binary division does not scale well. Its penalty grows with increases in address size.

The memory interface may instead use a hash or mapping function. However, a hash or mapping function can generate non-linear address holes to memory space. The address holes make it difficult to reconstruct a continuous address space for remapping in a downstream memory interface.

SUMMARY

An electronic system includes system memory having N interleaved channels, where N is not a power of two. In accordance with various embodiments and aspects herein, a hardware-implemented method for the electronic system includes receiving a request to access the system memory, the request including an M-bit address; and processing the address to calculate a modulo N of the address without performing division-by-N. The modulo N of the address is calculated as $[\Sigma_i\ \alpha_i \bmod N*2^{b_i} \bmod N] \bmod N$, where $\Sigma_i\ \alpha_i*2^{b_i}$ represents the M-bit address, $a_i$ is an $i^{th}$ word in the address, and $2^{b_i}$ is a power of two associated with the $i^{th}$ word. The method further includes using the modulo N of the address as an offset to determine which of the N interleaved channels to access.

In accordance with various embodiments and aspects herein, an electronic system includes system memory having N interleaved channels, where N is not a power of two. The system further includes an address decoder configured to receive a request to access the system memory, the request including an M-bit address; and process the address to calculate a modulo N of the address without performing division-by-N. The modulo N of the address is calculated as $[\Sigma_i\ \alpha_i \bmod N*2^{b_i} \bmod N] \bmod N$, where $\Sigma_i\ a_i*2^{b_i}$ represents the M-bit address, $a_i$ is an $i^{th}$ word in the address, and $2^{b_i}$ is a power of two associated with the $i^{th}$ word. The address decoder is further configured to adjust the address with the modulo N to ensure divisibility by N and provide the modulo N of the address as an offset to determine which of the N interleaved channels to access.

In accordance with various embodiments and aspects herein, a network-on-chip includes a transport interconnect, a target network interface unit (NIU) configured for an interleaved N-channel system memory, and a plurality of initiator NIUs for communicating with the target NIU via the transport interconnect, where N is not a power of two. At least one of the network interface units includes an address decoder configured to decode an M-bit address. The decoding includes processing the address to calculate a modulo N of the address without performing division-by-N. The modulo N of the address is calculated as $[\Sigma_i\ \alpha_i \bmod N*2^{b_i} \bmod N] \bmod N$, where $\Sigma_i\ \alpha_i*2^{b_i}$ represents the M-bit address, $a_i$ is an $i^{th}$ word in the address, and $2^{b_i}$ is a power of two associated with the $i^{th}$ word. The decoding further includes adjusting the address with the modulo N to ensure divisibility by N and providing the modulo N as an offset to determine which of the N interleaved channels to access.

BRIEF DESCRIPTION OF THE DRAWINGS

In order to understand the invention more fully, reference is made to the accompanying drawings. The invention is described in accordance with the aspects and embodiments in the following description with reference to the drawings or FIGURES (FIG.), in which like numbers represent the same or similar elements. Understanding that these drawings are not to be considered limitations in the scope of the invention, the presently described aspects and embodiments and the presently understood best mode of the invention are described with additional detail through use of the accompanying drawings.

FIG. 2 shows an example of 32-bit memory space for system memory having three channels, and the decoding of an address in that memory space.

FIG. 3 is a table of remainders for different power-of-two quotients and different non-power-of-two moduli.

FIG. 10 is a table that determines quotients and remainders for bits of an M-bit address.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

A lookup table generally refers to a data structure that is used to map input values to output values. As used herein, however, a lookup table also refers to its equivalents. One such equivalent is a Karnaugh map. By applying a Karnaugh map, a logic representation for the look up table may be obtained. The logic representation may be used instead of the data structure.

Figure 1:
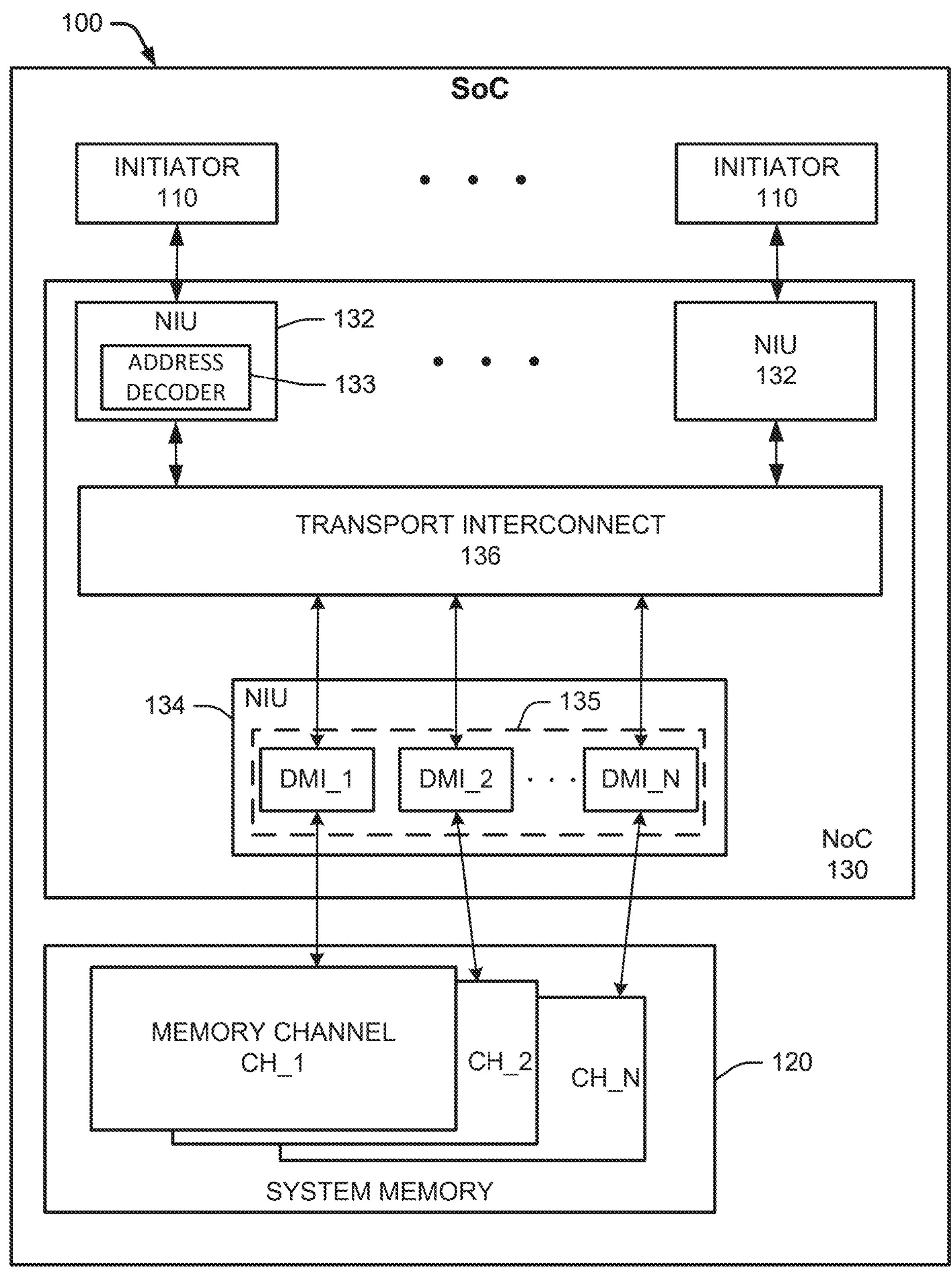
FIG. 1 shows a system on chip including a network-on-chip and multi-channel system memory in accordance with various aspects and embodiments herein.

Reference is made to FIG. 1, which illustrates an electronic system 100 including a plurality of initiators 110. Examples of the initiators 110 include, but are not limited to, central processing units (CPUs), graphical processing units (GPUs) and accelerators.

The electronic system 100 further includes system memory 120. The system memory 120 includes a number N of channels CH_1 to CH_N of non-volatile memory such as Double Data Rate (DDR). The number N is a non-power of two. In some embodiments, N may be a prime number greater than 2. For example, N is taken from the set {3, 5, 7, 11 and 13}.

The electronic system 100 further includes a network-on-chip (NoC) 130. Each initiator 110 sends request transaction to the system memory 120 via the NoC 130. A request transaction may include an M-bit target address, where M is a power of 2 (e.g., 32, 64, 128). The address may be virtual or physical. The NoC 130 decodes the address and transports the request transaction to the system memory 120. The system memory 120 handles the request transaction and sends a response transaction, via the NoC 130, back to the initiator 110 that sent the request transaction.

The NoC 130 includes a plurality of network interface units (NIUs) 132 and 134 and a transport interconnect 136. Each initiator 110 is coupled to the transport interconnect 146 via a corresponding initiator NIU 132. The system memory 120 is coupled to the transport interconnect 136 via a target NIU 134. Each initiator NIU 132 is configured to convert the protocol used by its corresponding initiator 110 into a packet-based transport protocol. The target NIU 134 is configured to convert the protocol used by the system memory 120 into a packet-based transport protocol.

The transport interconnect 136 transports packets between the NIUs 132 and 134. The transport interconnect 136 includes switches, adapters, and buffers. Switches may be used to route flows of traffic between source and destinations. Adapters may be used to deal with various conversions between data width, clock and power domains. Buffers may be used to insert pipelining elements to span long distances, or to store packets to deal with rate adaptation between fast senders and slow receivers or vice-versa.

The target NIU 134 includes a memory controller 135 having a number N of interfaces, such as direct memory interfaces (DMIs) DMI_1 to DMI_N. Each direct memory interface DMI_1 to DMI_N is coupled to a corresponding a memory channel CH_1 to CH_N and communicates directly with its corresponding memory channel. Each direct memory interface DMI_1 to DMI_N is also coupled to, and communicates with, the transport interconnect 136.

Each initiator NIU 132 includes an address decoder 133. The address decoder 133 includes logic for decoding an M-bit address in a horizontal direction to identify a cache line in the system memory 120, and then in a vertical direction to compute a modulo N of the M-bit address to identify the memory channel that stores the identified cache line.

Reference is made to FIG. 2, which illustrates an example of a 32-bit memory space for system memory 120 having N=3 channels. In this example, the memory space has a starting address (32'b1100_0000_0000_0000_0000_00Y_YYXX_XXXX) that preferably has an offset of zero and is therefore divisible by N. In this example, granularity of the interleaving is 512 byte blocks. Address bits 31 to 6 identify a cache line, and bits 5:0 identify a block within the cache line.

FIG. 2 also illustrates the decoding of an address in the vertical and horizontal directions in the memory space. For example, the following 32-bit address is sent to an address decoder: 32'b1100_9000_0000_0000_0000_00Y_YYXX_XXXX). At the address decoder, the address is decoded to identify a cache line (32'b1100_3000_0000_0000_0000_00Y_YY). As part of the decoding, the modulo 3 of the address is calculated, and the remainder is used to identify the channel that stores the identified cache line. The remainder may also be used to adjust the address so it is divisible by 3.

The address decoder 133 calculates the remainder without performing a division-by-N operation. Instead, the remainder is computed with simpler circuits such as lookup tables (LUTs). In some embodiments, additional circuits such as adders, and shift registers may also be used. The adders may perform unsigned addition or signed addition (if subtraction is applicable).

In computing, a modulo operation returns a remainder or signed remainder of a division, after the quotient is divided by the modulus. In the electronic system 100 of FIG. 1, let quotient Q represent an address, modulus N represent the number of interleaved channels, and remainder R represent an offset. Thus, Q(mod N)=R.

Now consider the sum of two numbers (X+Y), and the product of the two numbers (X*Y). The product and sum may be rewritten as follows:

$$XY(\bmod N) = X(\bmod N) * Y(\bmod N);$$

$$\text{and } (X+Y)(\bmod N) = [X(\bmod N) + Y(\bmod N)](\bmod N).$$

Now let an M-bit address be written as $a_{m-1}2^{m-1}+a_{m-2}2^{m-2}+\ldots+a_1 2^1+a_0 2^0$. The M-bit address may be rewritten as:

$$(4'ba_{m-1}a_{m-2}a_{m-3}a_{m-4})*16^{\frac{m-1}{4}}+\ldots+(4'ba_3a_2a_1a_0)*16^0.$$

The modulo N operation on the M-bit address may be written as:

$$\left[(4'ba_{m-1}a_{m-2}a_{m-3}a_{m-4})(\mathrm{mod}\,N)*16^{\frac{m-1}{4}}(\mathrm{mod}\,N)+\ldots+(4'ba_3a_2a_1a_0)(\mathrm{mod}\,N)*16^0(\mathrm{mod}\,N)\right](\mathrm{mod}\,N).$$

Additional reference is now made to FIG. 3, which illustrates tables of remainders for different quotients $2^b$ and moduli N. Attention is directed to the quotients of power 16 for modulo 3 operations. The remainders are all equal to one.

This can be used advantageously. Consider the example of a 12-bit word: 12'b 1101_0001_1001, which can be rewritten as follows:

$$(4'b1101)^*16^2+(4'b0001)^*16^1+(4'b1001)^*16^0.$$

Performing a modulo 3 operation on the 12-bit word yields:

$$[(4'b1101)(\mathrm{mod}\ 3)*16^2(\mathrm{mod}\ 3)+(4'b0001)(\mathrm{mod}\ 3)*16^1(\mathrm{mod}\ 3)+(4'b1001)(\mathrm{mod}\ 3)*16^0(\mathrm{mod}\ 3)]\quad(\mathrm{mod}\ 3).$$

As indicated in the table of FIG. 3, the modulo 3 operation of each power of 16 is equal to one. Thus, the modulo 3 operation reduces to the following:

$$[(4'b1101)(\mathrm{mod}\,3)+(4'b0001)(\mathrm{mod}\,3)+(4'b1001)(\mathrm{mod}\,3)](\mathrm{mod}\,3)=[1+1+0](\mathrm{mod}\,3)=2.$$

The modulo 3 operation on each 4 bit word can be found with a small lookup table. Thus, the modulo 3 operation on the 12-bit word can be performed with an adder and a lookup table. To increase speed, the three LUTs may perform the modulo 3 operations of the 4-bit words in parallel. The outputs of the LUTs are summed, and the modulus 3 of the sum is taken.

This approach can be expanded to the modulo 3 of a much larger m-bit word. The modulo 3 operation on each power of 16 reduces to one, whereby the remainders of all 4-bit words are summed, and a modulo 3 operation on the sum is performed.

Reference is once again made to the table of FIG. 3, and attention is directed to the quotients of power 4 for modulo 7 operations. All remainders of power 4 do not reduce to one. Instead, the remainders are 1, 4, 2 in a repeating pattern.

Now consider the 12-bit address 12'b1101_0001_1001, which can be rewritten as follows:

$$(2'b11)*4^5+(2'b01)*4^4+(2'b00)*4^3+(2'b01)*4^2+(2'b10)*4^1+(2'b'01)*4^0.$$

Performing a Mod 7 Operation on the 12-Bit Word Produces the Following:

$$[3*2+1*4+0+1*2+2*4+1*1](\mathrm{mod}\,7)=21(\mathrm{mod}\,7)=0.$$

The multiply-b-2 and multiply-by-4 operations can be performed by shift registers, the summation by an adder, and the modulo 7 operation by one or more LUTs. Complex division-by-7 is avoided.

Now Consider the Following 20-Bit Address:

$$(4'b1111)*16^4+(4'b0000)*16^3+(4'b1101)*16^2+(4'b0001)*16^1+(4'b1001)*16^0.$$

A modulo 11 operation on the powers produces the repeating pattern 1,5,3,4,9. Performing a modulo 11 operation produces on the 12-bit word produces the following:

$$[15*9+0*4+13*3+1*5+9*1](\mathrm{mod}\,11)=1.$$

As discussed below, the modulo 11 operation can also be implemented with LUTs, adders, and shift registers.

Figure 4:
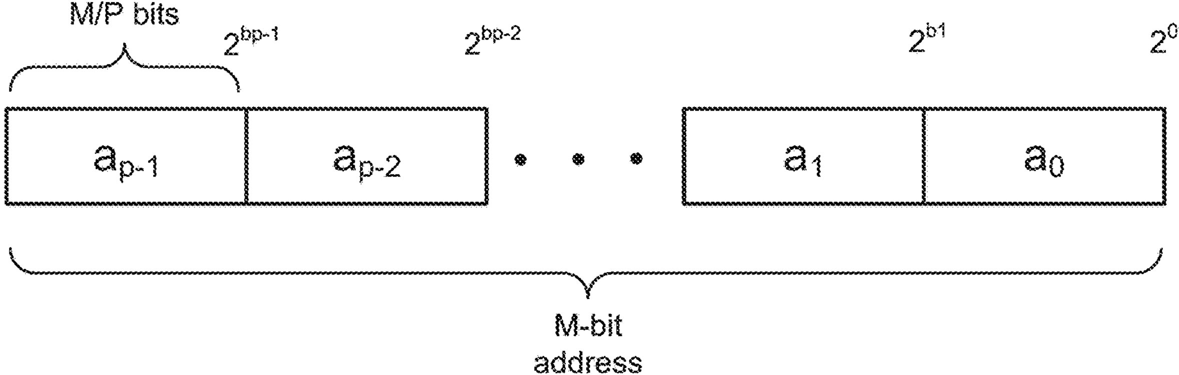
FIG. 4 shows an M-bit address.
Figure 5:
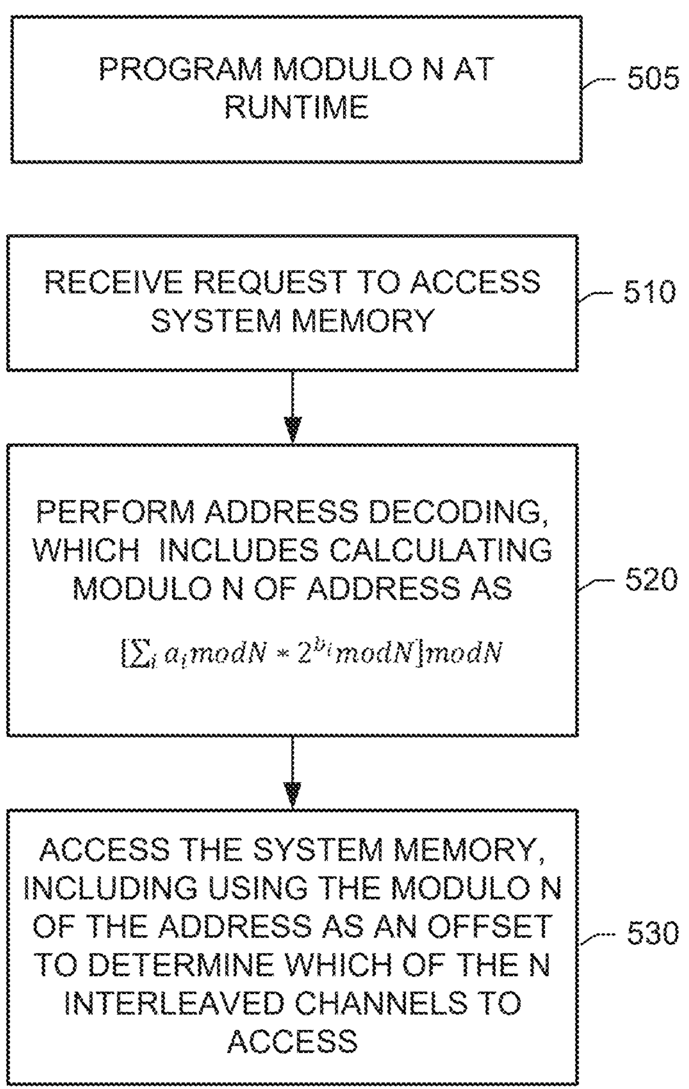
FIG. 5 shows a method of accessing system memory in accordance with various aspects and embodiments herein.

Reference is now made to FIGS. 4 and 5, which illustrate a general method of performing a modulo N operation on an M-bit address without performing division by N. As shown in FIG. 4, an M-bit address may be written as $\Sigma_i\,\alpha_i*2^{b_i}$ from i=0 to P−1, where $a_i$ is the $i^{th}$ word, and $2^{b_i}$ is the power of two that determines position of the $i^{th}$ word in the M-bit address. There are P words and M/P bits per word.

At block 510 in FIG. 5, a request to access the system memory is received. The memory access request includes an M-bit address.

At block 520, the M-bit address is decoded in an NIU (e.g., the address decoder 133 of an initiator NIU 132 or the memory controller 135 of the target NIU 134). The decoding includes performing a modulo N operation on the M-bit address without performing division-by-N. The modulo N of the address is calculated as follows:

$$\left[\sum_i a_i(\mathrm{mod}\,N)*2^{b_i}(\mathrm{mod}\,N)\right](\mathrm{mod}\,N).$$

The remainder of the modulo N operation will be used as an offset. The decoding further includes adjusting the address to ensure that it is divisible by N, and then dividing the address by N to produce the mapped address. The address may be adjusted by subtracting the offset.

At block 530, the system memory is accessed. The offset is used to determine which of the N interleaved channels to access.

Reference is once again made to the memory space in FIG. 2. The address is adjusted to ensure that it is divisible by 3, and then divided by 3 to produce a mapped address. The address may be adjusted by subtracting the offset.

The system memory is accessed using the mapped address. Granularity is 512 bytes. YYY represents 8 cache lines in such a granularity. An access pattern starts from the left most box, repeats eight cache lines for the memory at index 0, then moves to the memory at index 1, accesses eight more cache lines, jumps to the memory at index 2, accesses eight more cache lines, returns to the memory at index 0, and goes down one row. This same pattern is repeated. There are no bubbles or holes in the system memory.

In some embodiments, N is programmable at runtime. At block 505, For instance, the SoC starts with an interleaving scheme of 4 channels, but one of the channels has defects at runtime. A switch is made to interleave by 3.

A method herein offers several advantages over complex division by a non-power-of-two number. A method herein can calculate the remainder faster and with simpler logic.

A method herein scales well upwards. This feature is especially valuable for large memory spaces, such as those used by machine learning models.

A method herein also offers advantages over hash mapping and other functions. A method herein produces a mapping that is continuous and avoids address holes produced by hash mapping. This enables interleaved memory space to be distributed evenly with minimum area and timing impact to the address decoder.

A method herein has been described in connection with an address decoder in an initiator interface unit. However, a method herein is not so limited. In some embodiments, a method herein may be performed by an address decoder in a direct memory interface, which does memory remapping.

A method herein has been described in connection with a NoC. However, a method herein may be performed within another type of interconnect. In some embodiments, the interconnect is cache coherent, in other embodiments, the interconnect is not cache coherent.

A method herein is not limited to an interconnect. For example, a method herein may be performed by a cache controller or address decoder of a computer.

Figure 6:
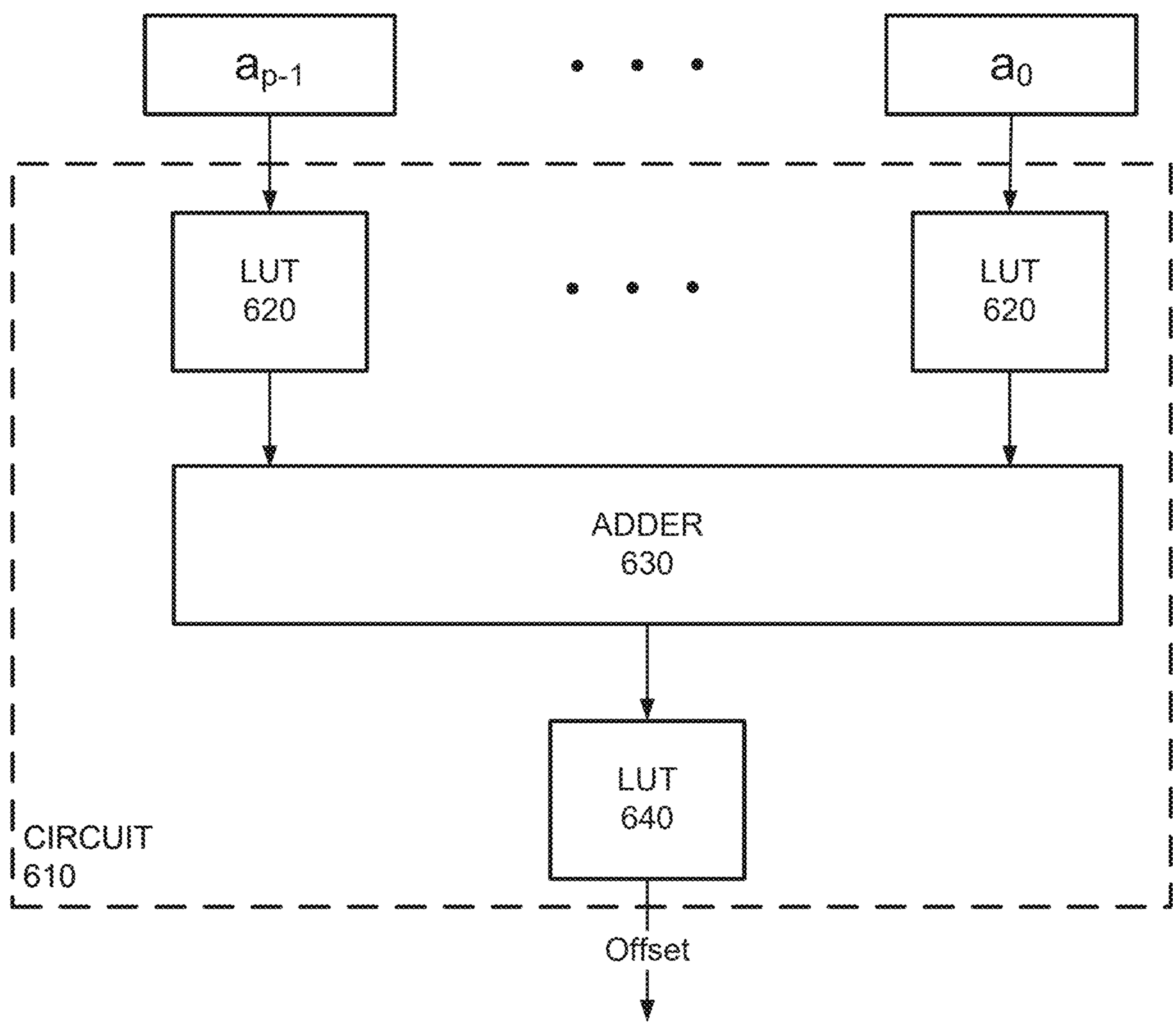
FIGS. 6, 7, 8 and 9 show different circuits for performing modulo operations on a memory address in accordance with various aspects and embodiments herein.

Reference is now made to FIG. 6, which illustrates an example of a circuit 610 for calculating the modulo N of an M-bit address, where $2^{b_i}$ is selected such that mod N of $2^{b_i}$=1 for all i. The circuit 610 includes P lookup tables 620. Each lookup table 620 receives a word $a_i$, and looks up the corresponding modulo N. Outputs of the lookup tables 620 are summed by an adder 630. An additional LUT 640 perform a modulo N operation on an output of the adder 630. An output of the LUT 640 is used an offset.

Figure 7:
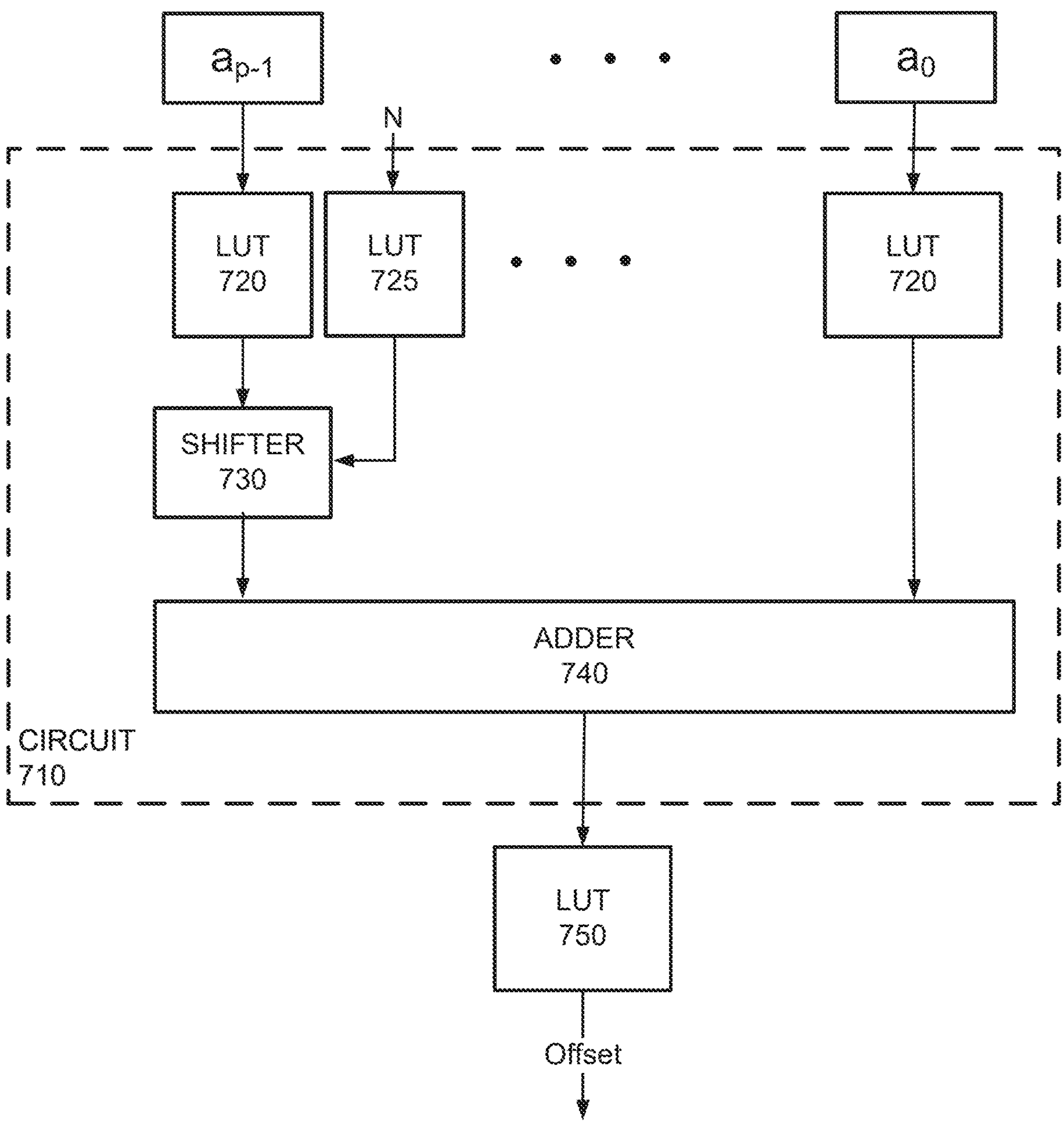

Reference is now made to FIG. 7, which illustrates an example of a circuit 710 for calculating the modulo N of an M-bit address, where the modulo N of $2^{b_i}$ includes only ones and powers of 2 over all i. The circuit 710 includes P LUTs 720. Each LUT 720 receives a word $a_i$, and looks up the corresponding modulo N. Outputs of the LUT 720 are shifted by shift registers 730. The amount of the shift for each shift register 730 is determined by $2^{b_i}$(mod N). The modulo N of $2^{b_i}$ may be determined by a lookup table 725 or it may be hard wired. Outputs of the shift registers 730 and the output of the LUT 720 for word $a_0$ are summed by an adder 740, and an additional lookup table 750 performs a modulo N operation on an output of the adder 740.

Figure 8:
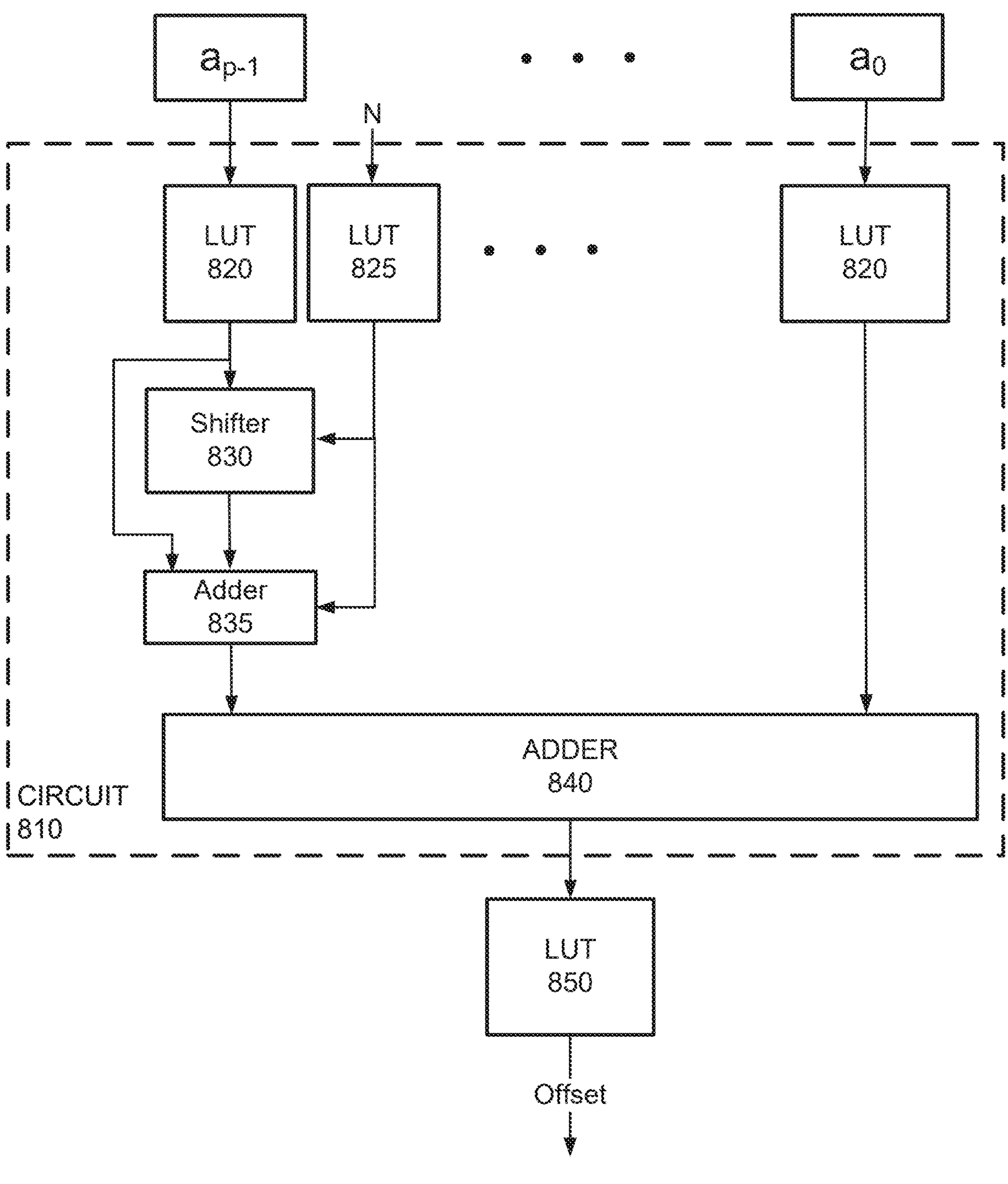

Reference is now made to FIG. 8, which illustrates an example of a circuit 810 for calculating the modulo N of an M-bit address, where mod N of $2^{b_i}$ includes ones, powers of 2, and non-powers of 2 over all i. The circuit 810 includes P LUT 820. Each LUT 820 receives a word $a_i$, and looks up the corresponding modulo N. Outputs of the LUTs 820 are shifted by shift registers 830. LUTs 825 determine the amount of the shift for each shift register 830 as $2^{b_i}$(mod N).

If the modulo N of $2^{b_i}$ includes a non-power of 2, the output of the LUT 820 is also supplied to the adder 835. For example, if the mod N of $2^{b_i}$ equals 5, then $5*\alpha_i$(mod N) may be performed by shifting $a_i$(mod N) to the left by two digits, and then adding $a_i$(mod N). The adders 835 may be signed adders if subtraction is performed.

Outputs of the adders 835 and an output of the LUT 820 for word $a_0$ are supplied to adder 840. An LUT 850 performs a modulo N operation on an output of the adder 840.

Some embodiments may also use subtracter. For instance, a modulus of 9 may be represented as 11-2. The number is shifted to the left, and 2 is subtracted from the shifted number.

The circuits 710 and 810 may use large lookup tables that cover different quotients ($2^{b_i}$) and moduli.

On the other hand, size of the lookup tables may be reduced. Consider the following 12-bit address:

12'b(ABCD)*16^2_(EFGH)*16_IJKL where $2^{b_i}$(mod N)=1 for all i. If a LUT is applied to the 4-bit word ABCD, the size of the LUT is 16 entries to store corresponding quotients and remainders (since ABCD can range from 4'b0000 to 4'b1111). If three LUTs are used for parallel processing, each of the three LUTs has 16 entries.

In some embodiments, the size of the LUT can be reduced. For every bit, a quotient and a remainder are pre-calculated and added together. Now consider a modulus of N=3 and a base of 2. The 12-bit address is written as $$A*2^{11}+B*2^{10}+\ldots+K*2^{1}+L*2^{0}.$$

A first lookup table determines the quotients from $2^{11}/N=Q_{11}$, $2^{10}/N=Q_{10}$, . . . , $2^{0}/N=Q_{0}$. The first LUT has only 12 entries. The first lookup table also shows the remainder pattern, which, according to FIG. 3, repeats as 1, 2, 1, 2. An example of the first LUT is provided in FIG. 10.

A second LUT computes the modulo 3 of the sum of the remainders. The second LUT may contain the same information as an LUT that calculates the offset, but contains extra information about the division result (that is, the integer portion of the quotient divided by the modulus).

Consider the bits 4'b1111. From the first LUT, $Q_3=2$, $Q_2=1$, $Q_1=0$ and $Q_0=0$. The sum of the remainders is (1+2+1+2)=6. The second LUT calculates the remainder as 6(mod 3), which equals 0. The second LUT has an extra column that stores the correct division result of 6/3=2. The final result is 3+2=5. The final result is the address in the vertical direction as shown in FIG. 2. As shown in the example, the address 4'b1111 will be mapped to interleaved address of 4'b101 so this way there aren't any holes when the system memory is accessed.

In the examples described above, all words have the same number of bits. However, a method herein is not so limited. Word size may be changed to ensure that the modulo can be handled. This is especially advantageous when dealing with artificial intelligence and other application that have huge memory spaces.

In some embodiments, additional levels of processing may be performed. Consider the example where mod N of $2^{b_i}$=1 for all i. At a first level of processing, $a_i$ (mod N) for each i is calculated. Then processing at one or more intermediate levels is performed. At each intermediate level, remainders from the previous level are formed into intermediate words, and remainders of the intermediate words are calculated and supplied to the next level. The intermediate processing may be performed until a single intermediate word is produced. A last level of processing is performed by calculating a modulo N of the single word.

Figure 9:
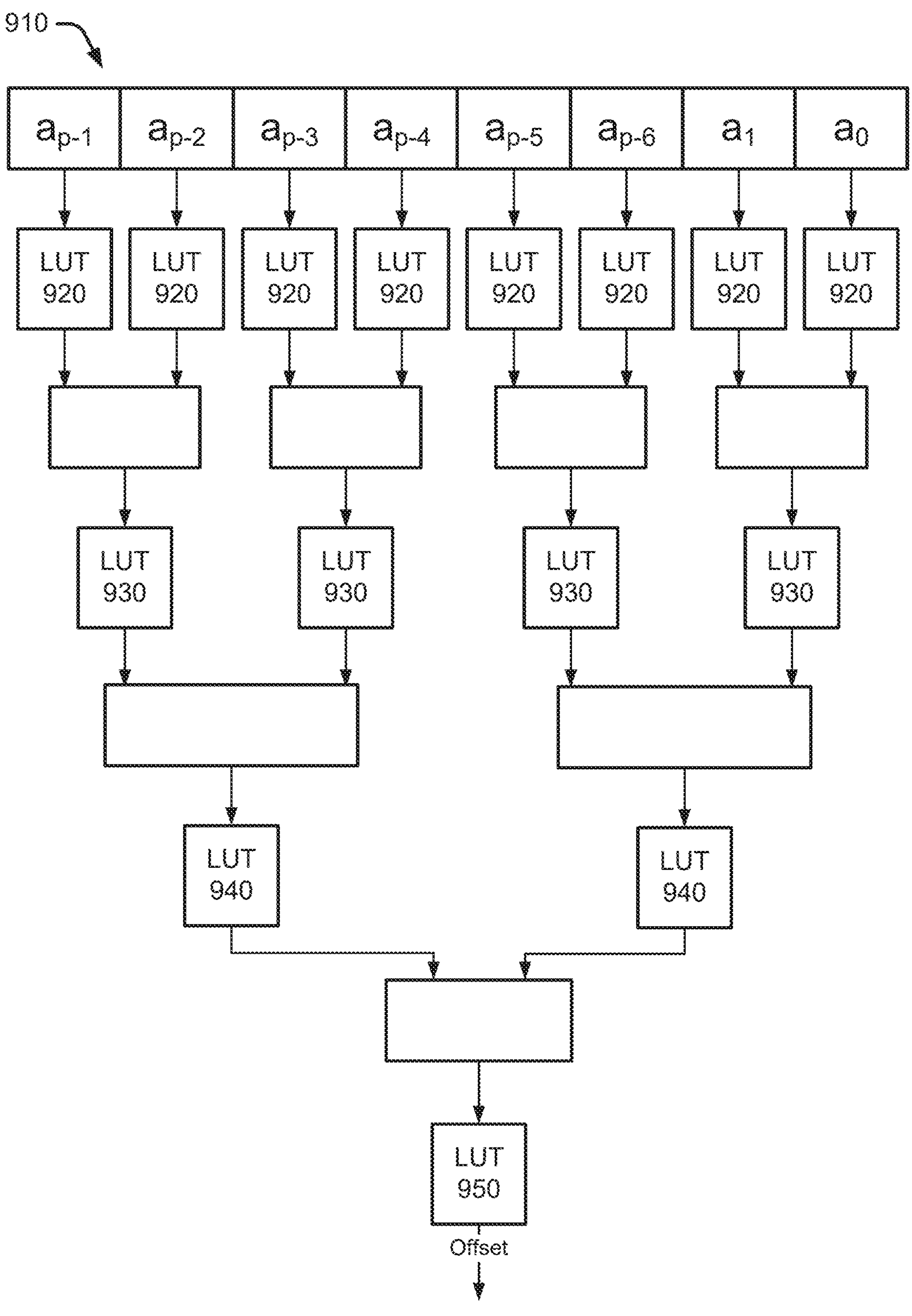

Reference is now made to FIG. 9, which illustrates an example of a circuit 910 that receives a 32-bit address and performs a modulo 3 operation. There are P=8 words $a_i$, and each word $a_i$ is 4-bits wide. The circuit 910 includes a plurality of LUTs 920, 930, 940 and 950 that take 4 bit inputs and produce 2-bit remainders for a modulus of N=3.

At a first level of processing, there are eight LUTs 920. Each LUT 920 is applied to a corresponding word $a_i$ to produce a remainder that is 2-bits wide. The first level of processing produces P=8 remainders.

At a second level of processing, there are four LUTs 930. The 2-bit wide remainders from the first level are grouped into four 4-bit words, and an LUT 930 is applied to each 4-bit words. The second level of processing produces P/2=4 remainders.

At a third level of processing, there are two LUTs 940. The P/2 remainders from the second level are grouped into P/4=2 intermediate words, and the two LUTs 940 are applied to the two intermediate words to produce two remainders.

At a last level of processing, the two remainders are grouped into a single 4-bit word, and an LUT 950 is applied to that single word. The remainder provided by the LUT 950 is used as the offset.

Thus, the modulo N of the M-bit word is calculated only with small LUTs. The modulo operation is performed quickly, in as fast as a single clock cycle. There is no adding, shifting, or division by N.

Other embodiments may use a combination of adders and LUTs. As a first example, the outputs of all of the LUTs 920 are supplied to an adder, and an LUT is applied to the output of the adder. As a second example, the outputs of a first half of the LUTs 920 are supplied to a first adder, and a first LUT is applied to the output of the first adder. Similarly, the outputs of a second half of the LUTs 920 are supplied to a second adder, and a second LUT is applied to the output of the second adder. Outputs of the first and second LUTs are added by a third adder, and a third LUT is applied to the output of the third adder to provide the offset.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Certain methods according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Various examples are methods that use the behavior of either or a combination of machines. Method examples are complete wherever in the world most constituent steps occur. For example, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A hardware-implemented method for an electronic system including system memory having N interleaved channels, where N is not a power of two, the method comprising:

receiving a request to access the system memory, the request including an M-bit address;

processing the address to calculate a modulo N of the address without performing division-by-N, wherein the modulo N of the address is calculated as $[\Sigma_i\ \alpha_i \bmod N{*}2^{b_i} \bmod N] \bmod N$, where $\Sigma_i\ \alpha_i{*}2^{b_i}$ represents the M-bit address, $a_i$ is an $i^{th}$ word in the address, and $2^{b_i}$ is a power of two associated with the $i^{th}$ word; and using the modulo N of the address as an offset to determine which of the N interleaved channels to access.

2. The method of claim 1, wherein the M-bit address has P words, and each of the words has M/P bits.

3. The method of claim 1, wherein look up tables are used to perform the modulo N.

4. The method of claim 1, wherein N is a prime number greater than 2.

5. The method of claim 1, wherein N is programmable at runtime.

6. The method of claim 1, wherein modulo N of $2^{b_i}=1$ for all i; and wherein the modulo N of the M-bit address is calculated with at least one adder and at least one lookup table.

7. The method of claim 1, wherein modulo N of $2^{b_i}$ includes at least one power of 2 over all i; and wherein the modulo N of the M-bit address is calculated with at least one adder, at least one shift register, and at least one lookup table.

8. The method of claim 7, wherein modulo N of $2^{b_i}$ further includes at least one odd integer great than one.

9. The method of claim 1, wherein modulo N of $2^{b_i}$ provides a repeating pattern over all i.

10. The method of claim 1, wherein b=1, wherein for every bit of the M-bit address, a quotient is calculated, a remainder for each quotient is calculated; and wherein all remainders are summed together to produce a sum, and a modulo N of the sum is calculated.

11. The method of claim 1, wherein the processing further include using the modulo N at a last level to adjust the address to ensure that the address is divisible by N.

12. An electronic system comprising:

system memory having N interleaved channels, where N is not a power of two; and an address decoder configured to receive a request to access the system memory, the request including an M-bit address;

process the address to calculate a modulo N of the address without performing division-by-N, wherein the modulo N of the address is calculated as $[\Sigma_i \alpha_i \bmod N*2^{b_i} \bmod N] \bmod N$, where $\Sigma_i \alpha_i*2^{b_i}$ represents the M-bit address, $a_i$ is an $i^{th}$ word in the address, and $2^{b_i}$ is a power of two associated with the $i^{th}$ word; and adjust the address with the modulo N to ensure divisibility by N and provide the modulo N of the address as an offset to determine which of the N interleaved channels to access.

13. The system of claim 12, further comprising a network-on-chip including a transport interconnect and a plurality of network interface units (NIUs) connected to the transport interconnect; wherein at least one of the NIUs includes the address decoder.

14. The system of claim 12, wherein the address decoder includes at least one look up table for performing the modulo N of the address.

15. The system of claim 12, wherein N is a prime number greater than 2.

16. The system of claim 12, wherein modulo N of $2^{b_i}=1$ for all i; and wherein the address decoder includes at least one adder and at least one lookup table for calculating the modulo N of the address.

17. The system of claim 12, wherein modulo N of $2^{b_i}$ includes at least one power of 2 over all i; and wherein the address decoder includes at least one adder, at least one shift register and at least one lookup table for calculating the modulo N of the address.

18. A network-on-chip comprising:

a transport interconnect;

a target network interface unit (NIU) configured for an interleaved N-channel system memory, where N is not a power of two; and a plurality of initiator NIUs for communicating with the target NIU via the transport interconnect;

wherein at least one of the network interface units includes an address decoder configured to decode an M-bit address, including:

processing the address to calculate a modulo N of the address without performing division-by-N, wherein the modulo N of the address is calculated as $[\Sigma_i \alpha_i \bmod N*2^{b_i} \bmod N] \bmod N$, where Z, $a_i*2^{b_i}$ represents the M-bit address, $a_i$ is an $i^{th}$ word in the address, and $2^{b_i}$ is a power of two associated with the $i^{th}$ word; and adjusting the address with the modulo N to ensure divisibility by N and providing the modulo N as an offset to determine which interleaved N-channels to access.

19. The network-on-chip of claim 18, wherein at least one of the initiator NIUs includes the address decoder.

20. The network-on-chip of claim 18, wherein the target NIU includes a direct memory interface; and wherein the direct memory interface includes the address decoder.

* * * * *